Patented Apr. 16, 1940

2,197,261

UNITED STATES PATENT OFFICE 2,197,261

COLORING OF METEOROLOGICAL BALLOONS

Arnolf P. Rehbock, Belmont, Mass., assignor to Dewey and Almy Chemical Company, North Cambridge, Mass., a corporation of Massachusetts No Drawing. Application March 30, 1938, Serial No. 199,047

3 Claims. (Cl. 244—31)

This invention relates to balloons which are used to obtain data on atmospheric conditions, such as pilot, sounding and ceiling balloons.

Such balloons are now supplied weather stations or artillery proving grounds in a number of different colors. To give maximum visibility under sky conditions existing at the time of use, that color is chosen which gives maximum contrast with the sky or the clouds. For example, a white balloon can be seen best against a deep-blue sky; while red, orange or black balloons can be seen best against clouds. The coloring is now obtained by incorporating a pigment or a dye in the rubber. Because of the requirement for balloons of different colors for different sky conditions, a large supply of balloons of various colors must be stored at the intended place of use, but, these observation points are frequently in inaccessible places, on mountain tops, the shores of the Arctic, and frequently on ships at sea. The maintenance of a large stock of colored balloons to meet the changing sky conditions so as to give maximum visibility against clouds or open sky has become a serious problem when balloons must be shipped to such inaccessible places. Again, since pilot balloons are now generally used to give wind corrections for gun-fire, the maintenance of a varied stock in war time would be next to impossible.

The object of the invention is to provide a method for imparting any desired color to a balloon at the place of its use and thereby reduce to a minimum the number of balloons which must be supplied to and stored at the releasing stations.

I have discovered that it is not necessary to furnish releasing stations with balloons colored to meet all sky conditions, but that a balloon which has a substantially colorless, translucent envelope may be quickly colored to meet any immediate sky condition by blowing into the balloon a colored pigment. Some powdered pigments stick well on the walls of the balloon. To secure the adhesion of pigments that do not stick well, I mix the pigment with a small amount of talc which causes it to be well distributed over the interior surface of the balloon and to adhere strongly. In this manner, although the talc is white, the color strength of the balloon surface is increased.

In adapting the usual pilot balloon for such use, the balloon envelope should be made as transparent or as translucent as possible. No fillers should be used in the rubber compound and the proportion of zinc oxide or other pigment-like activator which is necessary to cause vulcanization should be kept to the lowest possible chemical limit. Further, only those antioxidants shoulds be used which maintain the maximum translucency of the balloon envelope.

When balloons are thus colored immediately before their release, it is only necessary to supply the weather station with a stock of substantially colorless balloons and, at the same time, send a supply of dry pigments and talc. The balloon may be colored for the immediate sky condition merely by mixing a small amount of talc with the desired pigment and introducing this through the neck of the balloon. For certain balloons, it is advantageous to blow the pigment in with a small dusting gun, but, when balloons having large neck sizes are utilized, a small quantity of the pigment mixture may be put directly into the neck. After the interior of the balloon has been dusted with the pigment, the deflated balloon is kneaded with the hands for a moment or two to distribute the color uniformly over the whole interior wall. The balloon may then be inflated with hydrogen and released.

The exterior wall of the balloon may be colored in the same manner, preferably by rubbing dry pigment over the envelope, but this is usually objectionable since the powder is unconfined.

The adaptation of the balloon to the particular sky condition at the moment of its flight is a matter of a few moments only and the necessity for maintaining a large and varied stock of colored balloons is entirely eliminated.

I claim:

1. The method of imparting high visibility to pilot balloons at the time of flight which includes introducing a dry, powdered pigment into the balloon and distributing the pigment over the interior wall thereof.

2. The method of adapting a translucent balloon envelope to sky conditions at the time of flight to impart high visibility thereto which includes introducing a powdered pigment and a pigment carrier into the balloon and distributing the pigment over the interior wall thereof.

3. A meteorological balloon adapted for long-range visual observation comprising a substantially colorless rubber envelope and a sufficiently dense layer of dry, powdered pigment adhering to the interior of the envelope to produce strong color contrast to the sky conditions at the time of flight.

ARNOLF P. REHBOCK.